US012429937B2

(12) United States Patent
Gupta et al.

(10) Patent No.: US 12,429,937 B2
(45) Date of Patent: Sep. 30, 2025

(54) APPARATUS, SYSTEM AND METHOD OF PROVIDING A POWER SETTING FOR A PROCESSOR

(71) Applicant: Intel Corporation, Santa Clara, CA (US)

(72) Inventors: Meenakshi Gupta, Washougal, WA (US); James Hermerding, II, Vancouver, WA (US); Nir Lotan, Haifa (IL); Refael Mizrahi, Raanana (IL); Sudheer Nair, Portland, OR (US); Michal Perry, Haifa (IL); Daniel Polnoff, Beaverton, OR (US); Avishai Wagner, Kfar-saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/399,357

(22) Filed: Dec. 28, 2023

(65) Prior Publication Data
US 2025/0216916 A1 Jul. 3, 2025

(51) Int. Cl.
*G06F 1/28* (2006.01)
*G06F 1/20* (2006.01)

(52) U.S. Cl.
CPC ............... *G06F 1/28* (2013.01); *G06F 1/206* (2013.01)

(58) Field of Classification Search
CPC ...................................... G06F 1/28; G06F 1/206
See application file for complete search history.

(56) References Cited

U.S. PATENT DOCUMENTS

| 5,919,385 A * | 7/1999 | Kersten ................. H05B 3/744 219/448.11 |
| 11,703,930 B2 * | 7/2023 | Paul .......................... G06F 1/28 713/300 |
| 2019/0041967 A1 * | 2/2019 | Ananthakrishnan ........................ G06F 1/3293 |
| 2023/0031166 A1 * | 2/2023 | Scott .................. A47G 27/0443 |

OTHER PUBLICATIONS

Department of Electrical Engineering and Information Technologies, University of Naples, Naples, ItalyAntonio Marino et al., "PID Tuning with Neural Networks", ACIIDS 2019, LNAI 11431, pp. 476-487, 2019.

* cited by examiner

*Primary Examiner* — Zahid Choudhury
(74) *Attorney, Agent, or Firm* — Shichrur & Co.

(57) ABSTRACT

For example, a power-setting controller may be configured to provide a power setting for a processor based on one or more sensor-based inputs corresponding to one or more temperature sensors. For example, a sensor-based input corresponding to a temperature sensor may include a temperature input and a target temperature. For example, the power-setting controller may include one or more NNPID-based power controllers configured to provide one or more sensor-based power settings corresponding to the one or more temperature sensors. For example, an NNPID-based power controller of the NNPID-based power controllers may be configured to provide a sensor-based power setting corresponding to the temperature sensor based on the sensor-based input corresponding to the temperature sensor. For example, the NNPID-based power controller may include an NNPID controller configured to determine a temperature setting based on the temperature input and the target temperature corresponding to the temperature sensor.

20 Claims, 4 Drawing Sheets

APPARATUS, SYSTEM AND METHOD OF PROVIDING A POWER SETTING FOR A PROCESSOR

BACKGROUND

There may be a need to control a power setting for a processor, for example, to control the temperature of the processor, for example, due to safety and/or performance requirements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
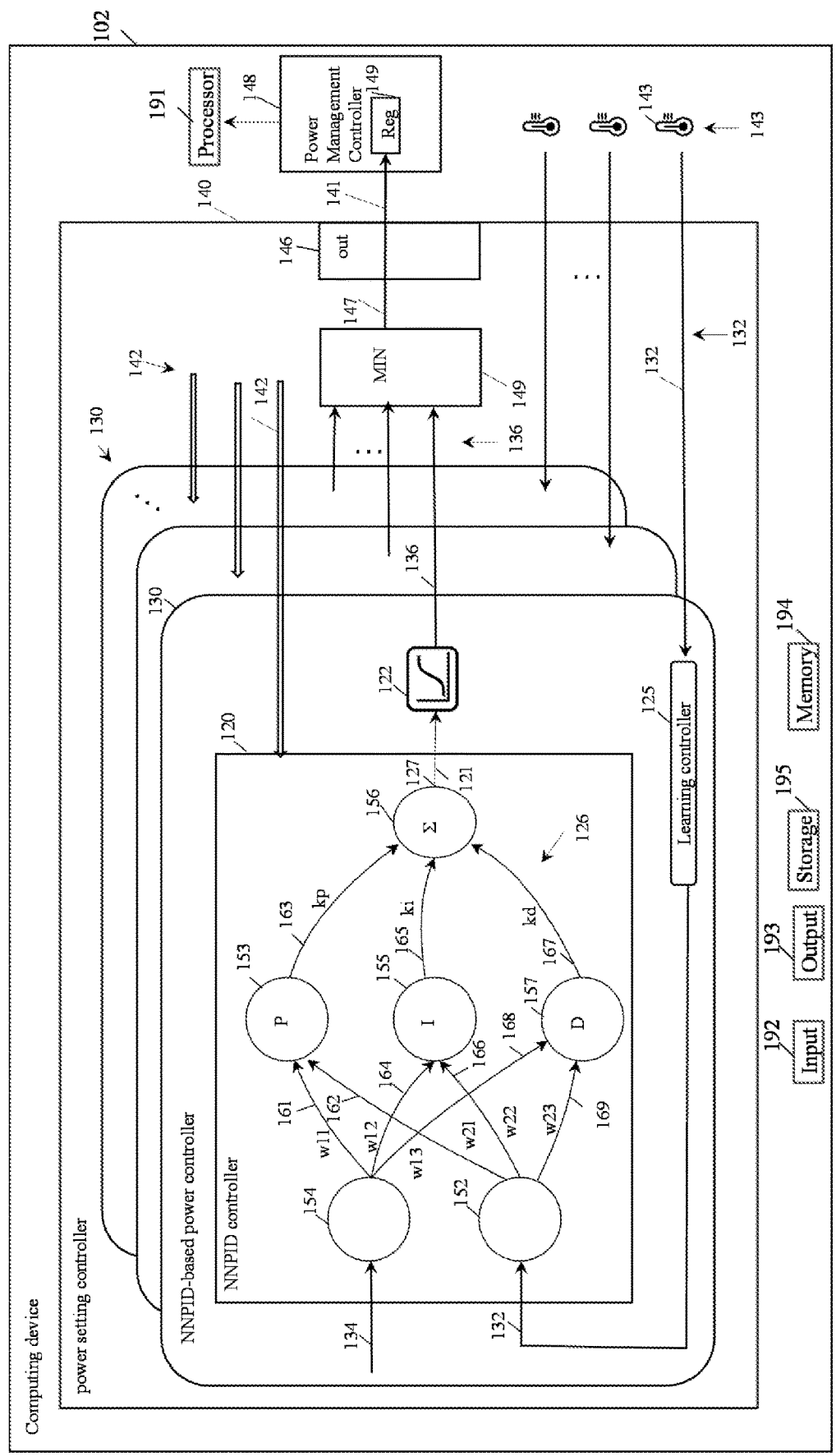
FIG. 1 is a schematic block diagram illustration of a computing device, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a computing device, an electronic device, an electrical device, a User Equipment (UE), a Mobile Device (MD), a wireless station (STA), a Personal Computer (PC), a desktop computer, a mobile computer, a laptop computer, a notebook computer, a tablet computer, a handheld computer, a sensor device, an Internet of Things (IoT) device, a wearable device, a handheld device, a Personal Digital Assistant (PDA) device, a handheld PDA device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, and the like.

As used herein, the term "circuitry" may refer to, be part of, or include, an Application Specific Integrated Circuit (ASIC), an integrated circuit, an electronic circuit, a processor (shared, dedicated or group), and/or memory (shared, Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Reference is now made to FIG. 1, which schematically illustrates a block diagram of a computing device 102, in accordance with some demonstrative aspects.

In some demonstrative aspects, computing device 102 may include an electrical device, a mobile device, a non-mobile device, a computing device, a wireless communication device, or the like.

In some demonstrative aspects, device 102 may include, for example, a UE, a mobile phone, an MD, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, an electrical device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), or the like.

In some demonstrative aspects, device 102 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of one or more of device 102 may be enclosed in a common housing or packaging, and may be interconnected or operably associated using one or more wired or wireless links. In other aspects, components of one or more of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS), e.g., a vehicular operating system, of device 102 and/or of one or more suitable applications.

In some demonstrative aspects, input unit 192 may include, for example, a touch-screen, a touch-pad, a trackball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a disk drive, a solid-state drive (SSD), and/or other suitable removable or non-removable storage units. Memory unit 194 and/or storage unit 195, for example, may store data processed by device 102.

In some demonstrative aspects, computing device 102 may be configured to implement one or more operations and/or functionalities of a thermal management and/or control mechanism to manage and/or control a temperature of at least one processor (also referred to as "target processor"), for example, processor 191, e.g., as described below.

In some demonstrative aspects, computing device 102 may include a power-setting controller 140, which may be configured to perform one or more operations and/or functionalities of a power-setting mechanism, for example, as part of a thermal management and/or control mechanism to control and/or manage a temperature of the target processor, for example, processor 191, e.g., as described below.

In some demonstrative aspects, power-setting controller 140 may be implemented as part of a host processor of computing device 102.

In some demonstrative aspects, power-setting controller 140 may include, or may be implemented, partially or entirely, by circuitry and/or logic, e.g., one or more processors including circuitry and/or logic, memory circuitry and/or logic. Additionally or alternatively, one or more functionalities of power-setting controller 140 may be implemented by logic, which may be executed by a machine and/or one or more processors, e.g., as described below.

In other aspects, power-setting controller 140 may be implemented as part of any other, dedicated, or indicated, element of computing device 102.

In some demonstrative aspects, power-setting controller 140 may be configured to implement one or more operations and/or functionalities of a power-setting mechanism to provide a power setting 141 for processor 191, for example, to control and/or manage a temperature of processor 191, e.g., as described below.

In some demonstrative aspects, power-setting controller 140 may be configured to implement one or more operations and/or functionalities of a power-setting mechanism, which may be configured, for example, to provide a technical solution to support a thermal management and/or control mechanism to maintain thermal limits of a platform, e.g., computing device 102, for example, without sacrificing performance of the platform.

In some demonstrative aspects, power-setting controller 140 may be configured to implement one or more operations and/or functionalities of a power-setting mechanism, which may be configured, for example, to provide a technical solution to support a thermal management and/or control mechanism to and/or manage a temperature of processor 191, e.g., as described below.

In some demonstrative aspects, power-setting controller 140 may be configured to determine a power setting of processor 191, for example, based on temperature measurements from one or more temperature sensors 143, e.g., as described below.

In some demonstrative aspects, one or more temperature sensors 143 may be configured to measure temperature at one or more locations at device 102.

For example, the one or more temperature sensors 143 may be configured to measure temperature at one or more locations in a vicinity of processor 191.

In some demonstrative aspects, power-setting controller 140 may be configured to provide a technical solution to determine, e.g., to automatically determine, platform settings, e.g., optimal platform settings, for example, processor power settings, for a platform, e.g., for computing device 102.

In some demonstrative aspects, power-setting controller 140 may be configured to provide a technical solution to determine platform settings, for example, processor power settings, which may be scaled across platform generations, for example, with minimal tuning by a manufacturer of a platform, e.g., an Original Equipment Manufacturer (OEM), an Original Design Manufacturer (ODM), or the like.

In some demonstrative aspects, in some use cases, and/or scenarios, there may be one or more technical issues, inefficiencies, disadvantages and/or problems when implementing device-specific thermal control algorithms, which may be configured for specific types of devices, e.g., Stock-Keeping Units (SKUs).

For example, some device-specific thermal control algorithms, which may be specific to an SKU, and/or to sensors of the platform, may require tuning efforts from a manufacturer of the platform. For example, the device-specific thermal control algorithms may be highly dependent on proper tuning and/or configuration by the manufacturer.

For example, requiring the manufacturer of the platform to perform tuning efforts may place an undue burden on the manufacture of the platform, which may result in poorly tuned systems in the field.

For example, many platform manufacturers may restrict tuning investments to selected designs, and even then, quite a bit of these designs may end up with sub-optimal configurations. For example, this situation may lead to degraded performance or underperformance of the platform.

In some demonstrative aspects, power-setting controller 140 may be configured to implement one or more operations and/or functionalities of a power-setting mechanism, which may be configured, for example, to provide a technical solution to support a thermal management and/or control mechanism, which may require reduced, e.g., minimal tuning, for example, while achieving improved performance, and/or a tighter thermal skin control, for example, if/when needed, e.g., as described below.

In some demonstrative aspects, power-setting controller 140 may be configured to implement one or more operations and/or functionalities of a power-setting mechanism, which may be configured, for example, to provide a technical solution to support a thermal management and/or control mechanism, which may alleviate tuning efforts, e.g., as described below.

In some demonstrative aspects, power-setting controller 140 may be configured to implement a self-learning mechanism of thermal control, for example, to support reduced, e.g., minimal, tuning, for example, while supporting a flexibility to achieve improved performance and/or a tight thermal skin control, for example, when needed, e.g., as described below.

In some demonstrative aspects, power-setting controller 140 may be configured to implement one or more operations and/or functionalities of a thermal management and/or control mechanism, for example, based on a Neural Network Proportional Integral Derivative (NNPID) technique, e.g., as described below.

In some demonstrative aspects, power-setting controller 140 may include a Machine Learning (ML) based NNPID controller, which may be configured to learn platform limitations of computing device 102, e.g., as described below.

In some demonstrative aspects, the ML-based NNPID controller may be configured set the power setting 141 with parameters, e.g., optimal parameters, for example, to obtain an improved, e.g., a maximal possible, performance of processor 191, e.g., as described below.

In some demonstrative aspects, power-setting controller 140 may be configured to implement a feedback control loop, which may be based, for example, on an NNPID controller, e.g., as described below.

In some demonstrative aspects, the NNPID controller may include one or more PID controllers, which may be configured to provide a technical solution to achieve dynamic performance and/or thermal scalability, for example, in opposed to a static closed loop thermal control mechanism, e.g., as described below.

In some demonstrative aspects, the thermal management and/or control mechanism may be configured to provide a technical solution to reduce, or even obviate, thermal tuning efforts, e.g., as described below.

In some demonstrative aspects, the thermal management and/or control mechanism may be configured to provide a technical solution to improve performance of a platform, for example, to a fullest potential, e.g., as described below.

In some demonstrative aspects, the thermal management and/or control mechanism may be configured to provide a technical solution, which may allow manufacturers to scale technology across multiple platforms.

In some demonstrative aspects, power-setting controller 140 may be configured to provide the power setting 141 for the processor 191, for example, based on one or more sensor-based inputs 142 corresponding to the one or more temperature sensors 143, e.g., as described below.

In some demonstrative aspects, a sensor-based input 142 corresponding to a temperature sensor 143 may include a temperature input 132, e.g., based on a temperature sensed by the temperature senor 143, and a target temperature 134 corresponding to the temperature senor 143, e.g., as described below.

In some demonstrative aspects, power-setting controller 140 may include one or more NNPID-based power controllers 130, e.g., as described below.

In some demonstrative aspects, the one or more NNPID-based power controllers 130 may be configured to provide one or more sensor-based power settings 136 corresponding to the one or more temperature sensors 143, e.g., as described below.

In some demonstrative aspects, an NNPID-based power controller 130 of the NNPID-based power controllers 130 may be configured to provide a sensor-based power setting 136 corresponding to the temperature sensor 143, for example, based on the sensor-based input 142 corresponding to the temperature sensor 143, e.g., as described below.

In some demonstrative aspects, the NNPID-based power controller 130 may include an NNPID controller 120, which may be configured to determine a temperature setting 121, for example, based on the temperature input 132 and the target temperature 134 corresponding to the temperature sensor 143, e.g., as described below.

In some demonstrative aspects, the NNPID-based power controller 130 may include a converter 122, which may be configured to convert the temperature setting 121 into the sensor-based power setting 136, e.g., as described below.

For example, converter 122 may be implemented by NNPID-based power controller 130 to provide a technical solution to support controlling an element from one domain, e.g., power limit of the processor 191, for example, while using feedback from another, different, domain, e.g., the temperature measurement from the temperature sensor 143.

For example, the measured element, e.g., the temperature, may have a scale, which may be different from a scale of the controlled variable, e.g., the power limit of the processor 191.

In some demonstrative aspects, may be configured to convert the temperature setting 121 into the sensor-based power setting 136, for example, based on the scale of the temperature measurement from the temperature sensor 143 and the scale of the power limit of the processor 191.

In some demonstrative aspects, NNPID controller 120 may be configured to operate within a unitless, e.g., normalized, domain, for example, to provide technical solution to improve, e.g., optimize, effectiveness, and/or to expedite a learning process of NNPID controller 120.

For example, the temperature input 132 and the target temperature 134 in sensor-based input 142 may be normalized, e.g., based on a ratio between the current_temperature and a maximum_temperature. For example, the temperature setting 121 may be scaled to the power limit domain, e.g., to generate the sensor-based power setting 136.

In some demonstrative aspects, converter 122 may be configured to convert the temperature setting 121 into the sensor-based power setting 136, for example, based on a product of the temperature setting 121 by a scaling_factor. In other aspects, converter 122 may be configured to convert the temperature setting 121 into the sensor-based power setting 136 based on any other additional and/or alternative scaling functions.

In some demonstrative aspects, power-setting controller 140 may include an output 146 configured to provide the power setting 141, for example, based on the one or more sensor-based power settings 136, e.g., as described below.

In some demonstrative aspects, power-setting controller 140 may be configured to store the power setting 141 in a register 149 of a power management controller 148 of the processor 191.

In other aspects, power-setting controller 140 may be configured to provide the power setting 141 to the power management controller 148 and/or to any other element of device 102 via any other suitable additional or alternative mechanism and/or interface.

In some demonstrative aspects, the NNPID controller 120 may include a neural network 126, which may include a plurality of NN nodes, e.g., as described below.

In some demonstrative aspects, the NNPID controller 120 may include a first NN input node 154, which may be configured to input the target temperature 134 corresponding to the temperature sensor 143, e.g., as described below.

In some demonstrative aspects, the NNPID controller 120 may include a second NN input node 152, which may be configured to input the temperature input 132 corresponding to the temperature sensor 143, e.g., as described below.

In some demonstrative aspects, the NNPID controller 120 may include an NN Proportional (P) node 153, which may be configured to provide a P-node output 163, for example, based on a first weighted combination of an output of the first NN input node 154 and an output of the second NN input node 152, e.g., as described below.

In one example, the NN P node 153 may determine the P-node output 163, denoted kp, for example, based on a sum of a weighted value 161 and a weighted value 162. For example, the weighted value 161 may be based on a weight, denoted w11, applied to the output of the first NN input node 154. For example, the weighted value 162 may be based on a weight, denoted w21, applied to the output of the second NN input node 152. For example, the NN P node 153 may determine the P-node output 163, e.g., as follows:

$$Kp = \sum_i \text{input}_i$$

In other aspects, the NN P node 153 may determine the P-node output 163 based on any other suitable weighted combination of the output of the first NN input node 154 and the output of the second NN input node 152.

In some demonstrative aspects, the NNPID controller 120 may include an NN Integral (I) node 155, which may be configured to provide an I-node output 165, for example, based on a second weighted combination of the output of the first NN input node 154 and the output of the second NN input node 152, e.g., as described below.

In one example, the NN I node 155 may determine the I-node output 165, denoted ki, for example, based on an integral over time of the sum of a weighted value 164 and a weighted value 166. For example, the weighted value 164 may be based on a weight, denoted w12, applied to the output of the first NN input node 154. For example, the weighted value 166 may be based on a weight, denoted w22, applied to the output of the second NN input node 152. For example, the NN I node 155 may determine the I-node output 165, e.g., as follows:

$$ki = \int_0^t \sum_i \text{input}_i$$

In other aspects, the NN I node 155 may determine the I-node output 165 based on any other suitable weighted combination of the output of the first NN input node 154 and the output of the second NN input node 152.

In some demonstrative aspects, the NNPID controller 120 may include an NN Derivative (D) node 157, which may be configured to provide a D-node output 167, for example, based on a third weighted combination of the output of the first NN input node 154 and the output of the second NN input node 152, e.g., as described below.

In one example, NN D node 157 may determine a D-node output 167, denoted kd, for example, based on a derivative over time of the sum of a weighted value 168 and a weighted value 169. For example, the weighted value 168 may be based on a weight, denoted w13, applied to the output of the first NN input node 154. For example, the weighted value 169 may be based on a weight, denoted w23, applied to the output of the second NN input node 152. For example, the NN D node 157 may determine the D-node output 167, e.g., as follows:

$$kd = \frac{d}{dt} \sum_i \text{input}_i$$

In other aspects, the NN D node 157 may determine the D-node output 167 based on any other suitable weighted combination of the output of the first NN input node 154 and the output of the second NN input node 152.

In some demonstrative aspects, the NNPID controller 120 may include a combiner 156, which may be configured to provide the temperature setting 121 at an NN output node 127, for example, based on a combination of the P-node output 163, the I-node output 165, and the D-node output 167, e.g., as described below.

In one example, combiner 156 may be configured to provide the temperature setting 121, denoted u, at the NN output node 127, for example, based on a sum of the P-node output 163, the I-node output 165, and the D-node output 167, e.g., as follows:

$$u = kp + ki + kd$$

In other aspects, combiner 156 may be configured to provide the temperature setting 121 based on any other combination and/or function applied to the P-node output 163, the I-node output 165, and the D-node output 167.

In some demonstrative aspects, the one or more sensor-based inputs 142 may include a plurality of sensor-based inputs 142, which may correspond to a plurality of temperature sensors 143, e.g., as described below.

In some demonstrative aspects, the one or more NNPID-based power controllers 130 may include a plurality of NNPID-based power controllers 130, which may be configured to provide a plurality of sensor-based power settings 136, for example, based on the plurality of sensor-based inputs 142, e.g., as described below.

In some demonstrative aspects, the power setting 141 may be based, for example, on one or more of the plurality of sensor-based power settings 136, e.g., as described below.

In some demonstrative aspects, the power setting 141 may be based, for example, on some of the plurality of sensor-based power settings 136, e.g., as described below.

In other aspects, the power setting 141 may be based, for example, on all of the plurality of sensor-based power settings 136.

In some demonstrative aspects, the power setting 141 may be based, for example, on a minimal power setting 147 of the plurality of sensor-based power settings 136, e.g., as described below.

In some demonstrative aspects, power-setting controller 140 may include a minimal power setting detector 149 to detect the minimal power setting 147 of the plurality of sensor-based power settings 136, e.g., as described below.

In other aspects, the power setting 141 may be based on any other condition and/or unction applied to the plurality of sensor-based power settings 136.

In some demonstrative aspects, the NNPID-based power controller 130 may be configured to provide the sensor-based power setting 136, for example, based a temperature tolerance, e.g., as described below.

In some demonstrative aspects, the sensor-based input 142 corresponding to the temperature sensor 143 may include a temperature tolerance corresponding to the temperature sensor 143, e.g., as described below.

In some demonstrative aspects, the NNPID-based power controller 130 may be configured to provide the sensor-based power setting 136, for example, based on the temperature tolerance corresponding to the temperature sensor 143, e.g., as described below.

In some demonstrative aspects, the NNPID-based power controller 130 may be configured to determine one or more NN settings of the NNPID controller 120, for example, based on the temperature tolerance corresponding to the temperature sensor 143, e.g., as described below.

In some demonstrative aspects, the one or more sensor-based inputs 142 may include a first sensor-based input 142 including a first temperature tolerance corresponding to a first temperature sensor 143, e.g., as described below.

In some demonstrative aspects, the one or more sensor-based inputs 142 may include a second sensor-based input 142 including a second temperature tolerance corresponding to a second temperature sensor 143, e.g., as described below.

In some demonstrative aspects, the second temperature tolerance may be different from the first temperature tolerance, e.g., as described below.

In some demonstrative aspects, a first NNPID-based power controller 130 may be configured to determine one or more first NN settings of an NNPID controller 120 of the first NNPID-based power controller 130, for example, based on the first temperature tolerance corresponding to the first temperature sensor 143, e.g., as described below.

In some demonstrative aspects, a second NNPID-based power controller 130 may be configured to determine one or more second NN settings of an NNPID controller 120 of the second NNPID-based power controller 130, for example, based on the second temperature tolerance corresponding to the second temperature sensor 143, e.g., as described below.

In some demonstrative aspects, the one or more second NN settings of the NNPID controller of the second NNPID-based power controller 130 may be different from the one or more first NN settings of the NNPID controller of the first NNPID-based power controller 130.

In some demonstrative aspects, the temperature tolerance may be implemented to represent an enumerated configuration, which may influence network tolerance of NNPID controller 120, e.g., as described below.

In some demonstrative aspects, the temperature tolerance may signify a degree of precision required for temperature regulation of NNPID controller 120. For example, the temperature tolerance may impact internal network parameters of NNPID controller 120, which may, subsequently, affect a learning process of NNPID controller 120.

In some demonstrative aspects, the temperature tolerance may be implemented to provide a technical solution to support a user to choose from a preconfigured set of behaviors.

For example, a user may be allowed to select between a tight temperature control, or a temperature overshoot level, e.g., to improve performance of the learning process of NNPID controller 120.

In some demonstrative aspects, the NNPID-based power controller 130 may be configured to determine one or more NN settings of the NNPID controller 120, for example, based on the temperature tolerance corresponding to the temperature sensor 143, e.g., as described below.

In some demonstrative aspects, the one or more NN settings (also referred to as "dynamic parameters") of the NNPID controller 120 may include inputs to the neural network 156 of NNPID controller 120.

For example, unlike temporal parameters, e.g., temperature input 132 and/or target temperature 134, which may change relatively often, e.g., every iteration, the dynamic parameters may be expected to change less often, e.g., only when required.

For example, the dynamic parameters may be implemented as a kind of hyper-parameters, which may affect the behavior of the neural network 126 of the NNPID controller 120, and/or may indirectly have an effect on weights of the neural network 156.

In some demonstrative aspects, the one or more NN settings may affect formulas of the neural network 156 of NNPID controller 120. For example, some NN settings may be factor multipliers, while other NN settings may be variables in one or more formulas.

In some demonstrative aspects, the one or more NN settings of the NNPID controller 120 may include a learning rate of the NNPID controller 120, e.g., as described below.

In some demonstrative aspects, the NNPID-based power controller 130 may be configured to set a first learning rate of the NNPID controller 120, for example, based on a first temperature tolerance, e.g., as described below.

In some demonstrative aspects, the NNPID-based power controller 130 may be configured to set a second learning rate of the NNPID controller 120, for example, based on a second temperature tolerance, e.g., as described below.

In some demonstrative aspects, the first learning rate may be higher than the second learning rate, for example, when the first temperature tolerance is higher than the second temperature tolerance, e.g., as described below.

In one example, the learning rate may include a learning rate of a neural network model. For example, the learning rate may determine a rate at which the NNPID controller 120 adapts weights of the neural network 126.

For example, a value of the learning rate may be configured, for example, such that the NNPID-based power controller 130 may not update the weights too aggressively, which may result in not converging to an optima. For example, the value of the learning rate may be configured, for example, such that the value may not be too small, which may result in a long time to converge to an optima.

In some demonstrative aspects, the temperature tolerance may be used by the NNPID-based power controller 130 to set the learning rate for the neural network 126, for example, to provide a technical solution to support using a dynamic value for the learning rate, for example, according to a required temperature tolerance setting.

In some demonstrative aspects, the one or more NN settings of the NNPID controller 120 may include a smoothing factor of the NNPID controller 120, e.g., as described below.

In some demonstrative aspects, the NNPID-based power controller 130 may be configured to set a first smoothing factor of the NNPID controller 120, for example, based on the first temperature tolerance, e.g., as described below.

In some demonstrative aspects, the NNPID-based power controller 130 may be configured to set a second smoothing factor of the NNPID controller 120, for example, based on the second temperature tolerance, e.g., as described below.

In some demonstrative aspects, the first smoothing factor may be higher than the second smoothing factor, for example, when the first temperature tolerance is higher than the second temperature tolerance, e.g., as described below.

In some demonstrative aspects, the smoothing factor may be utilized to define an aggressiveness of the control of the neural network 126. For example, for a high temperature tolerance the control may not be as smooth as for lower temperature tolerances. For example, for a high temperature tolerance there may be variations in a thermal response curve, for example, compared to other temperature tolerance modes. For example, for a low temperature tolerance, a thermal response curve may be much smoother, for example, due to the smoothing factor.

In some demonstrative aspects, the one or more NN settings of the NNPID controller 120 may include a temperature offset of the NNPID controller 120, e.g., as described below.

In some demonstrative aspects, the temperature offset may include, for example, an offset from the target temperature 134 at which the NNPID controller 120 is to be activated, e.g., as described below.

In some demonstrative aspects, the NNPID-based power controller 130 may be configured to set a first temperature offset of the NNPID controller 120, for example, based on the first temperature tolerance, e.g., as described below.

In some demonstrative aspects, the NNPID-based power controller 130 may be configured to set a second temperature offset of the NNPID controller 120, for example, based on the second temperature tolerance, e.g., as described below.

In some demonstrative aspects, the first temperature offset may be higher than the second temperature offset, for example, when the first temperature tolerance is higher than the second temperature tolerance, e.g., as described below.

In one example, the NNPID controller 120 may potentially start acting much later, for example, at a high tolerance mode, for example to provide a higher performance potential. Accordingly, a higher temperature offset value may be used in the high tolerance mode. For example, a lower temperature offset value may be used in other tolerance modes, for example, to allow the NNPID controller 120 to act much earlier, for example, to control closer to the target temperature 134.

In some demonstrative aspects, the one or more NN settings of the NNPID controller 120 may include a batch size, e.g., as described below.

In some demonstrative aspects, the NNPID-based power controller 130 may be configured to set a first batch size, for example, based on the first temperature tolerance, e.g., as described below.

In some demonstrative aspects, the NNPID-based power controller 130 may be configured to set a second batch size, for example, based on the second temperature tolerance.

In some demonstrative aspects, the first batch size may be different from the second batch size, for example, when the first temperature tolerance is higher than the second temperature tolerance.

In one example, the batch size may define a number of samples to be processed, for example, before weights of the NNPID controller 120 may be updated. For example, a high batch size may indicate that the weights of the NNPID controller 120 may be updated after a large number of samples. For example, a high batch size may be utilized to prevent the weights from changing too quickly, which may lead, for example, to a more stable signal. For example, a small batch size may indicate that the weights of the NNPID controller 120 may be updated more quickly, for example, to adjust to changes in the temperature.

In other aspects, the one or more NN settings of the NNPID controller 120, which may be set based on the temperature tolerance, may include any other additional and/or alternative NN settings.

In some demonstrative aspects, the temperature tolerance corresponding to the temperature sensor 143 may include a predefined temperature tolerance setting from a plurality of predefined temperature tolerance settings, e.g., as described below.

In some demonstrative aspects, the NNPID-based power controller 130 may be configured to determine one or more NN settings of the NNPID controller 120, for example, according to a predefined NN setting corresponding to the predefined temperature tolerance setting, e.g., as described below.

In some demonstrative aspects, the plurality of predefined temperature tolerance settings may include a high tolerance setting, a medium tolerance setting, and/or a low tolerance setting, e.g., as described below.

In other aspects, the plurality of predefined temperature tolerance settings may include any other additional and/or alternative temperature tolerance settings.

In some demonstrative aspects, a plurality of predefined NN settings corresponding to the plurality of predefined temperature tolerance settings may be defined.

In some demonstrative aspects, the plurality of predefined NN settings may be configured to provide a technical solution to dynamically update a control mechanism of the NNPID controller 120, for example, based on a plurality of predefined platform temperature tolerances.

In one example, the temperature tolerance for a platform may be setup, for example, by a manufacturer, for example, based on a target market of the platform.

In some demonstrative aspects, a plurality of specific predefined temperature tolerance settings may be defined with respect to the plurality of sensors 143.

For example, a specific temperature tolerance may be defined for a sensor 143, e.g., for each sensor 143.

In one example, a plurality of specific temperature tolerance settings corresponding to the plurality of sensors 143 may be dynamically updated, for example, via a table-based mechanism, e.g., as follows:

TABLE 1

| Target | Target Temperature | Temperature Overshoot Tolerance |
|---|---|---|
| CPU | X | High |
| Sensor1 | Y | Medium |
| Sensor2 | Z | Low |

For example, power setting controller 140 may be configured to receive the temperature tolerance settings of Table 1, for example, as part of the information included in the one or more sensor-based inputs 142.

For example, according to Table 1, a first temperature sensor, e.g., a temperature sensor of a processor, or in close proximity to the processor, may be defined to have a first target temperature, denoted X, and a high temperature tolerance.

For example, according to Table 1, a second temperature sensor may be defined to have a second target temperature, denoted Y, and a medium temperature tolerance.

For example, according to Table 1, a third temperature sensor may be defined to have a third target temperature, denoted Z, and a low temperature tolerance.

In some demonstrative aspects, a mapping may be defined between the plurality of predefined temperature tolerance settings and the plurality of NN settings of the NNPID controller 120, e.g., various ML model parameters.

In some demonstrative aspects, changing from a first predefined temperature tolerance setting to a second temperature tolerance setting may modify a model behavior, for example, to achieve a desired result.

In one example, the high tolerance setting, the medium tolerance setting, and/or the low tolerance setting may be mapped to a high-tolerance NN setting, a medium-tolerance NN setting, and/or a low-tolerance NN setting, respectively.

In one example, a configuration file may be used to map the high tolerance setting, the medium tolerance setting, and/or the low tolerance setting to the high-tolerance NN setting, the medium-tolerance NN setting, and/or the low-tolerance NN setting, respectively, e.g., as follows:

"Map_TemperatureOvershootTolerance_LearningParameters": {
"High": {
"LearningRate": 0.125,
"SmoothingFactor": 0.2,
"TempOffset": 1
},
"Medium": {
"LearningRate": 0.1,
"SmoothingFactor": 0.05,
"TempOffset": 3
},
"Low": {
"LearningRate": 0.1,
"SmoothingFactor": 0.05,
"TempOffset": 3
}
}, In other aspects, any other additional and/or alternative mapping may be defined, and/or any other additional and/or alternative values for the NN settings may be defined.

In some demonstrative aspects, the high-tolerance NN setting corresponding to the high tolerance setting may be used to indicate that it may be acceptable to overshoot the target temperature 134, for example, for a certain amount of time, for example, to allow a better processor performance.

In some demonstrative aspects, the low-tolerance NN setting corresponding to the low tolerance setting, and/or the medium-tolerance NN setting corresponding to the medium tolerance setting, may be used to indicate a gradual reduction in tolerance and, accordingly, in processor performance.

Figure 2:
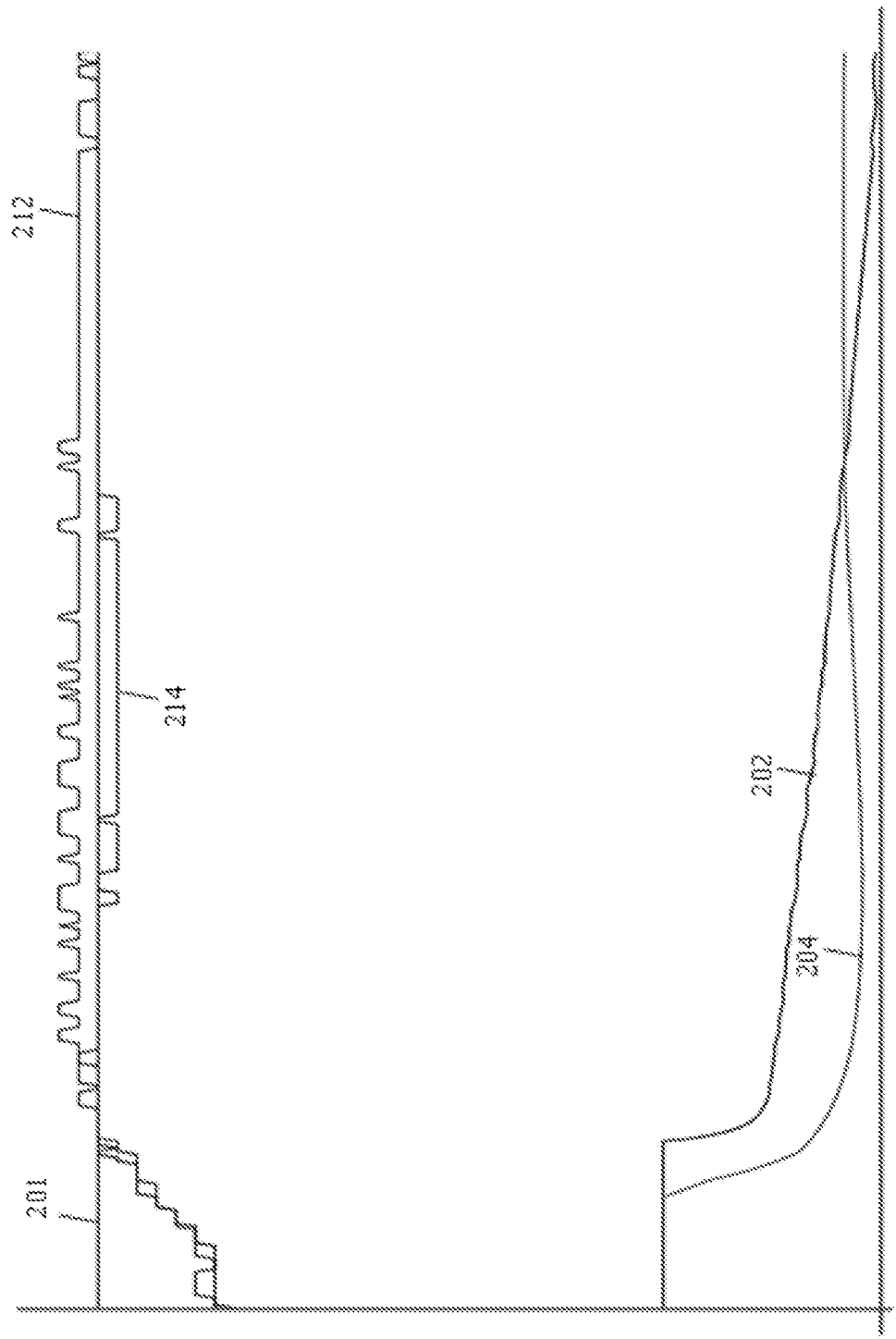
FIG. 2 is a schematic illustration of a graph depicting a first temperature response and a second temperature response of a processor, in accordance with some demonstrative aspects.

Reference is made to FIG. 2, which schematically illustrates a graph depicting a first temperature response 212 and a second temperature response 214 of a processor, in accordance with some demonstrative aspects.

In one example, first temperature response 212 and/or the second temperature response 214 may correspond to a temperature response of processor 191 (FIG. 1).

In one example, first temperature response 212 may correspond to a high temperature tolerance setting.

In one example, second temperature response 214 may correspond to a low temperature tolerance setting.

In some demonstrative aspects, as shown in FIG. 2, the high temperature tolerance setting may result in the temperature response 212, which may be allowed to often exceed a target temperature 201.

In some demonstrative aspects, as shown in FIG. 2, the high temperature tolerance setting may result in the temperature response 212, which may take a relatively long time to converge to the target temperature 201.

In some demonstrative aspects, as shown in FIG. 2, the low temperature tolerance setting may result in the temperature response 214, which may not be allowed to often exceed the target temperature 201.

In some demonstrative aspects, as shown in FIG. 2, the low temperature tolerance setting may result in the temperature response 214, which may converge to the target temperature 201 relatively quick.

In some demonstrative aspects, as shown in FIG. 2, the high temperature tolerance setting may result in a power setting represented by a power setting curve 202.

In some demonstrative aspects, as shown in FIG. 2, the low temperature tolerance setting may result in a power setting represented by a power setting curve 204.

In some demonstrative aspects, as shown in FIG. 2, the power setting (curve 202) resulting from the high temperature tolerance setting may be, for example, less aggressive than the power setting (curve 204) resulting from the low temperature tolerance setting.

In some demonstrative aspects, as shown in FIG. 2, the high temperature tolerance setting may result in a relatively gradual reduction in power (curve 202).

In some demonstrative aspects, as shown in FIG. 2, the high temperature tolerance setting may result in a relatively sharp reduction in power (curve 204).

Referring back to FIG. 1, in some demonstrative aspects, the power-setting controller 140 may be configured to provide the sensor-based power setting 136, for example, based on at least one power threshold, e.g., as described below.

In some demonstrative aspects, the sensor-based input 142 corresponding to the temperature sensor 143 may include a setting of at least one power threshold corresponding to the target temperature 134, e.g., as described below.

In some demonstrative aspects, the power-setting controller 140 may be configured to determine the sensor-based power setting 136, for example, based on the at least one power threshold, e.g., as described below.

In some demonstrative aspects, the at least one power threshold may include a minimal power threshold (also referred to as a "minimum power limit"), and/or a maximal power threshold (also referred to as a "maximum power limit"), e.g., as described below.

In other aspects, any other additional or alternative power threshold may be implemented.

In some demonstrative aspects, the minimum power limit and/or the maximum power limit may serve as constraints to an output power of the NNPID controller 120, e.g., within specified bounds.

For example, the maximum power limit may set an upper bound on the output power of the NNPID controller 120. For example, if the output power of the NNPID controller 120 exceeds the maximum power limit, the output power may be capped, for example, according to the maximum power limit.

For example, the minimum power limit may set a lower bound on the output power of the NNPID controller 120. For example, if the output power of the NNPID controller 120 is below the minimum power limit, the output power may be raised, for example, according to the minimum power limit.

In some demonstrative aspects, the minimum power limit and/or the maximum power limit may be utilized to provide a technical solution to ensure that computing device 102 maintains a certain level of activity.

In some demonstrative aspects, the minimum power limit and/or the maximum power limit may be utilized to provide a technical solution to ensure that processor 191 does not drop to, or does not exceed, ineffective and/or unsafe power values.

In some demonstrative aspects, the minimum power limit and/or the maximum power limit may be dynamic and may not remain constant. Accordingly, the minimum power limit and/or the maximum power limit may affect a backpropagation process, for example, by influencing an error calculated during the backpropagation process, which may lead to different learning outcomes, e.g., based on different power limits.

In some demonstrative aspects, the sensor-based input 142 corresponding to the temperature sensor 143 may include a plurality of settings of the least one power threshold. For example, the plurality of settings of the least one power threshold may correspond to a plurality of target temperatures corresponding to the temperature sensor 143, e.g., as described below.

In some demonstrative aspects, the power-setting controller 140 may be configured to determine the power setting 141 for the processor, for example, based on one or more additional settings of the at least one power threshold, e.g., as described below.

In some demonstrative aspects, the one or more additional settings of the at least one power threshold may correspond to one or more additional target temperatures, which are between two consecutive target temperatures in the first plurality of target temperatures, e.g., as described below.

In some demonstrative aspects, the power-setting controller 140 may be configured to determine the one or more additional settings of the at least one power threshold, for example, based on two settings of the at least one power threshold corresponding to the two consecutive target temperatures, e.g., as described below.

In some demonstrative aspects, the power-setting controller 140 may be configured to determine the one or more additional settings of the at least one power threshold, for example, based on an interpolation of the two settings of the at least one power threshold corresponding to the two consecutive target temperatures, e.g., as described below.

In other aspects, the power-setting controller 140 may be configured to determine the one or more additional settings of the at least one power threshold based on any other additional or alternative calculation and/or function applied to the two settings of the at least one power threshold corresponding to the two consecutive target temperatures.

In some demonstrative aspects, the power-setting controller 140 may be configured to determine the one or more additional settings of the at least one power threshold to include, for example, one or more additional settings of the minimal power threshold corresponding to the one or more additional target temperatures, e.g., as described below.

In some demonstrative aspects, the power-setting controller 140 may be configured to determine the one or more additional settings of the at least one power threshold to include, for example, one or more additional settings of the maximal power threshold corresponding to the one or more additional target temperatures, e.g., as described below.

In some demonstrative aspects, the one or more additional settings of the at least one power threshold may be utilized, for example, to provide a technical solution to support a plurality of temperature targets for a same sensor.

For example, a linear interpolation may be applied to the plurality of settings of the least one power threshold corresponding to the plurality of target temperatures, which may be inputs to NNPID-based power controller 130, for example, to provide a technical solution to achieve a more granular and/or flexible control of the power setting across various temperature ranges.

In one example, the plurality of settings of the least one power threshold may include two settings of the minimal (Source PL1Min) and maximal (Source PL1Max) power thresholds corresponding to two consecutive target temperatures for a particular temperature sensor (SEN1), e.g., as follows:

TABLE 2

| Target | Target Temperature | Source PL1Min (mw) | Source PL1Max (mw) |
|---|---|---|---|
| SEN1 | 40 | 20000 | 30000 |
|  | 45 | 10000 | 20000 |

For example, Table 2 may include a first setting of the minimal and maximal power thresholds corresponding to a first target temperature of 40 degrees.

For example, as shown in Table 2, the first setting of the minimal and maximal power thresholds may include a setting of a first minimal power threshold, e.g., 20000 milliwatts (mw), and a setting of a first maximal power threshold, e.g., 30000 mw, corresponding to a first target temperature of 40 degrees.

For example, Table 2 may include a second setting of the minimal and maximal power thresholds corresponding to a second target temperature of 45 degrees, which may be consecutive to the first target temperature of 40 degrees.

For example, as shown in Table 2, the second setting of the minimal and maximal power thresholds may include a setting of a second minimal power threshold, e.g., 10000 mw, and a setting of a second maximal power threshold, e.g., 20000 mw.

In some demonstrative aspects, the power-setting controller 140 may be configured to determine a plurality of additional settings of the minimal and maximal power thresholds corresponding to a plurality of additional temperatures, e.g., between the temperatures of 40 degrees and 45 degrees, for example, based on an interpolation of the two settings of Table 2.

In some demonstrative aspects, a setting of the minimal and maximal power thresholds for an additional temperature may be determined, for example, based on a temperature ratio (temp ratio).

In one example, the temperature ratio may be based on a difference between the two consecutive target temperatures, and a difference between the additional target temperature and the first target temperature, e.g., as follows:

$$\text{temp\_ratio} = \frac{\text{current\_temp} - \text{prev\_row\_temp\_target}}{\text{next\_row\_temp\_target} - \text{prev\_row\_temp\_target}} \quad (1)$$

wherein next_row_temp_target−prev_row_temp_target denotes the difference between the two consecutive target temperatures, current_temp denotes the additional target temperature, and prev_row_temp_target denotes the first target temperature.

In some demonstrative aspects, the power-setting controller 140 may be configured to determine the additional setting, denoted interpolate_value, of a power threshold corresponding to the additional target temperature, for example, based on the temperature ratio, e.g., as follows:

$$\text{interpolate\_value} = \text{previous\_limit} - \{\text{temp\_ratio} * (\text{prev\_limit} - \text{next\_limit})\} \quad (2)$$

wherein, previous_limit denotes a first setting of the power threshold, and next_limit denotes a second setting of the power threshold.

In some demonstrative aspects, the power-setting controller 140 may be configured to determine a plurality of additional settings corresponding to a plurality of additional target temperatures between 40 degrees and 45 degrees, for example, based on Equation 2.

In one example, the power-setting controller 140 may be configured to determine the plurality of additional settings corresponding to the plurality of additional target temperatures including the temperatures 41, 42, 43 and 44, e.g., as follows:

TABLE 3

| Target | Target Temp | Temp Ratio | Source PL1Min (mw) (Interpolated) | Source PL1Max (mw) (Interpolated) |
|---|---|---|---|---|
| SEN1 | 40 | | 20000 | 30000 |
| | 41 | (41 − 40)/ (45 − 40) = 1/5 | 20000 − 1/5 * (20000 − 10000) = 18000 | 30000 − 1/5 * (30000 − 20000) = 28000 |
| | 42 | (42 − 40)/ (45 − 40) = 2/5 | 20000 − 2/5 * (20000 − 10000) = 16000 | 30000 − 2/5 * (30000 − 20000) = 26000 |
| | 43 | (43 − 40)/ (45 − 40) = 3/5 | 20000 − 3/5 * (20000 − 10000) = 14000 | 30000 − 3/5 * (30000 − 20000) = 24000 |
| | 44 | (44 − 40)/ (45 − 40) = 4/5 | 20000 − 4/5 * (20000 − 10000) = 12000 | 30000 − 4/5 * (30000 − 20000) = 22000 |
| | 45 | | 10000 | 20000 |

For example, the power-setting controller 140 may be configured to determine a temperature ratio of 1/5 corresponding to an additional temperature of 41, for example, based on the calculation (41−40)/(45−40)=1/5, e.g., according to Equation 1.

For example, the power-setting controller 140 may be configured to determine a minimal power threshold of 18000 mw corresponding to the additional temperature of 41, for example, based on the temperature ratio of 1/5, the first minimal power threshold, e.g., 20000 mw, and the second minimal power threshold, e.g., 10000 mw, for example, based on the calculation 20000−1/5*(20000−10000)= 18000, e.g., according to Equation 2.

In some demonstrative aspects, the power setting controller 140 may be configured to provide to the NNPID controller 120 a setting of the minimal power threshold and/or the maximal power threshold corresponding to a particular actual temperature, e.g., according to Table 3.

In some demonstrative aspects, the NNPID-based power controller 130 may include a learning controller 125, which may be configured to control a learning activity of the NNPID controller 120, e.g., as described below.

In one example, learning controller 125 may determine one or more specific conditions to enable a learning activity ("when-to-learn") of NNPID controller 120. For example, the learning activity may not always be required, for example, since the power setting 141 may establish an upper boundary for a power limit or processor 191, which may indirectly affect the controlled variable, e.g., temperature. For example, this may be in contrast to NN-PID systems that set a precise output.

In some demonstrative aspects, one or more specific conditions for enabling the learning actively may be implemented, for example, to provide a technical solution to support relatively quickly adaptation to a change in conditions.

In some demonstrative aspects, learning controller 125 may be configured to implement one or more operations and/or functionalities of a "when-to-learn" mechanism, which may be configured to provide a technical solution to adapt to thermal variations, e.g., which may not necessitate alternations in the power limit setting. For example, the learning activity may not be required, for example, in case the temperature is decreasing, and the frequency of the processor 191 is at its maximum.

In some demonstrative aspects, learning controller 125 may be configured to provide a technical solution to maintain optimal network weight values of NNPID controller 120, for example, in scenarios where modification of the weight values may lead to divergence of the neural network 126.

In some demonstrative aspects, learning controller 125 may be configured to provide a technical solution to rapidly adapt to temperature changes, for example, while maintaining balance with a preservation of network stability of neural network 126.

In some demonstrative aspects, learning controller 125 may be configured to determine "how-to-learn" conditions for NNPID controller 120. For example, learning controller 125 may set values of the learning rate and/or the smoothing factor, for example, where conditions derive different learning parameters. For example, when the sensor temperature 132 exceeds a desired threshold, learning controller 125 may change the values of the learning rate and/or the smoothing factor, for example, to allow the learning mechanism of NNPID controller 120 to adapt faster.

In some demonstrative aspects, learning controller 125 may control the learning of NNPID controller 120, for example, based on a temperature threshold, e.g., as described below.

For example, the temperature threshold may define a point at which NNPID controller 120 is to commence learning. For example, below the temperature threshold, NNPID controller 120 may not engage in learning, e.g., as the learning may potentially be ineffective.

For example, power-setting controller 140 may manage a variable, e.g., the power setting 141, which may indirectly influence a controlled variable, e.g., the temperature. Accordingly, NNPID controller 120 may not always be required to learn.

Figure 3:
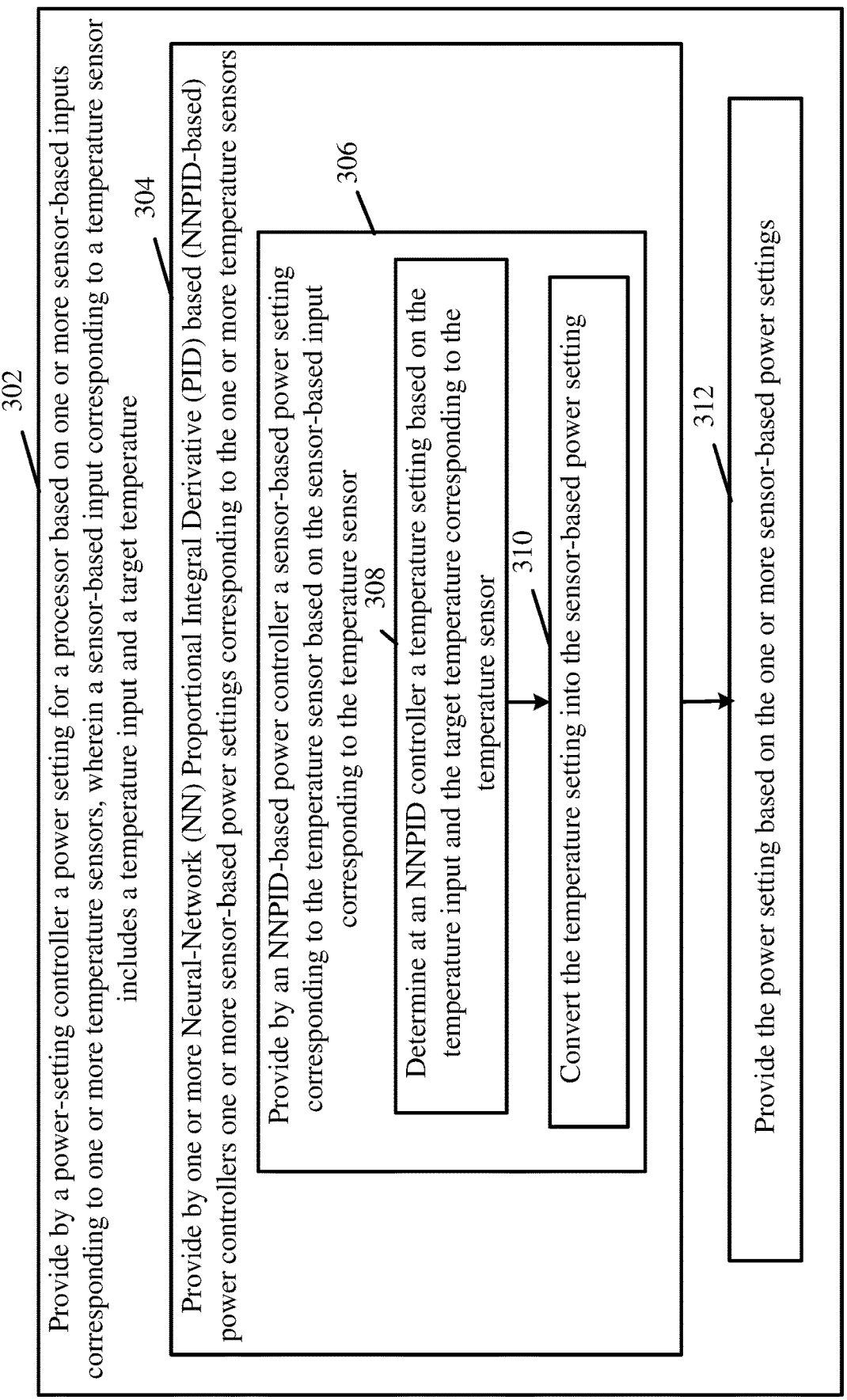
FIG. 3 is a schematic flow-chart illustration of a method of providing a power setting for a processor, in accordance with some demonstrative aspects.

Reference is made to FIG. 3, which schematically illustrates a method of providing a power setting for a processor, in accordance with some demonstrative aspects. For example, one or more of the operations of the method of FIG. 3 may be performed by a power-setting controller, e.g., a power-setting controller 140 (FIG. 1); an NNPID-based power controller, e.g., NNPID-based power controller 130 (FIG. 1); and/or an NNPID controller, e.g., NNPID controller 120 (FIG. 1).

As indicated at block 302, the method may include providing by a power-setting controller a power setting for a processor (target processor) based on one or more sensor-based inputs corresponding to one or more temperature sensors. For example, a sensor-based input corresponding to a temperature sensor may include a temperature input and a target temperature. For example, power-setting controller 140 (FIG. 1) may be configured to provide the power setting 141 (FIG. 1) for the processor 191 (FIG. 1), for example, based on the one or more sensor-based inputs 142 (FIG. 1) corresponding to the one or more temperature sensors 143 (FIG. 1), e.g., as described above.

As indicated at block 304, providing the power setting for the target processor may include providing by one or more Neural-Network (NN) Proportional Integral Derivative (PID) based (NNPID-based) power controllers one or more sensor-based power settings corresponding to the one or more temperature sensors. For example, the one or more NNPID-based power controllers 130 (FIG. 1) may be configured to provide the one or more sensor-based power settings 136 (FIG. 1) corresponding to the one or more temperature sensors 143 (FIG. 1), e.g., as described above.

As indicated at block 306, providing the one or more sensor-based power settings corresponding to the one or more temperature sensors may include providing by an NNPID-based power controller a sensor-based power setting corresponding to the temperature sensor based on the sensor-based input corresponding to the temperature sensor. For example, NNPID-based power controller 130 (FIG. 1) may be configured to provide the sensor-based power setting 136 (FIG. 1) based on the sensor-based input 142 (FIG. 1) corresponding to the temperature sensor 143 (FIG. 1), e.g., as described above.

As indicated at block 308, providing the sensor-based power setting corresponding to the temperature sensor may include determining at an NNPID controller a temperature setting based on the temperature input and the target temperature corresponding to the temperature sensor based on the sensor-based input corresponding to the temperature sensor. For example, NNPID controller 120 (FIG. 1) may be configured to determine the temperature setting 121 (FIG. 1), for example, based on the temperature input 132 (FIG. 1) and the target temperature 134 (FIG. 1) corresponding to the temperature sensor 143 (FIG. 1), e.g., as described above.

As indicated at block 310, providing the sensor-based power setting corresponding to the temperature sensor may include converting the temperature setting into the sensor-based power setting. For example, NNPID-based power controller 130 (FIG. 1) may be configured to convert, for example, by converter 122 (FIG. 1), the temperature setting 121 (FIG. 1) into the sensor-based power setting 136 (FIG. 1), e.g., as described above.

As indicated at block 312, providing the power setting for the processor may include providing the power setting based on the one or more sensor-based power settings. For example, power-setting controller 140 (FIG. 1) may be configured to provide, for example, via output 146 (FIG. 1), the power setting 141 (FIG. 1), for example, based on the one or more sensor-based power settings 136 (FIG. 1), e.g., as described above.

Figure 4:
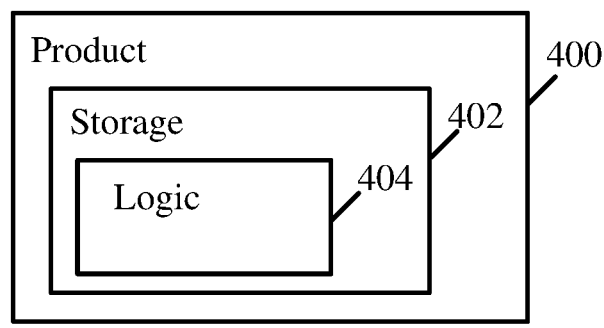
FIG. 4 is a schematic illustration of a product of manufacture, in accordance with some demonstrative aspects.

Reference is made to FIG. 4, which schematically illustrates a product of manufacture 400, in accordance with some demonstrative aspects. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at computing device 102 (FIG. 1), power-setting controller 140 (FIG. 1), NNPID-based power controller 130 (FIG. 1), and/or NNPID controller 120 (FIG. 1); to cause computing device 102 (FIG. 1), power-setting controller 140 (FIG. 1), NNPID-based power controller 130 (FIG. 1), and/or NNPID controller 120 (FIG. 1) to perform, trigger and/or implement one or more operations and/or functionalities; and/or to perform, trigger and/or implement one or more operations and/or functionalities described with reference to the FIGS. 1-3, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 400 and/or machine readable storage media 402 may include one or more types of computer-readable storage media capable of storing data, including volatile memory, non-volatile memory, removable or non-removable memory, erasable or non-erasable memory, writeable or re-writeable memory, and the like. For example, machine readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

Examples

The following examples pertain to further aspects.

Example 1 includes an apparatus comprising a power-setting controller configured to provide a power setting for a processor, e.g., a target processor, based on one or more sensor-based inputs corresponding to one or more temperature sensors, wherein a sensor-based input corresponding to a temperature sensor comprises a temperature input and a target temperature, the power-setting controller comprising one or more Neural-Network (NN) Proportional Integral Derivative (PID) based (NNPID-based) power controllers configured to provide one or more sensor-based power settings corresponding to the one or more temperature sensors, wherein an NNPID-based power controller of the NNPID-based power controllers is configured to provide a sensor-based power setting corresponding to the temperature sensor based on the sensor-based input corresponding to the temperature sensor, the NNPID-based power controller comprising an NNPID controller configured to determine a temperature setting based on the temperature input and the target temperature corresponding to the temperature sensor; and a converter configured to convert the temperature setting into the sensor-based power setting; and an output to provide the power setting based on the one or more sensor-based power settings.

Example 2 includes the subject matter of Example 1, and optionally, wherein the sensor-based input corresponding to the temperature sensor comprises a temperature tolerance corresponding to the temperature sensor, wherein the NNPID-based power controller is configured to provide the sensor-based power setting based on the temperature tolerance corresponding to the temperature sensor.

Example 3 includes the subject matter of Example 2, and optionally, wherein the NNPID-based power controller is configured to determine one or more NN settings of the NNPID controller based on the temperature tolerance corresponding to the temperature sensor.

Example 4 includes the subject matter of Example 2 or 3, and optionally, wherein the one or more NN settings of the NNPID controller comprises a learning rate of the NNPID controller.

Example 5 includes the subject matter of Example 4, and optionally, wherein the NNPID-based power controller is configured to set a first learning rate of the NNPID controller based on a first temperature tolerance, and to set a second learning rate of the NNPID controller based on a second temperature tolerance, wherein the first temperature tolerance is higher than the second temperature tolerance, wherein the first learning rate is higher than the second learning rate.

Example 6 includes the subject matter of any one of Examples 2-5, and optionally, wherein the one or more NN settings of the NNPID controller comprises a smoothing factor of the NNPID controller.

Example 7 includes the subject matter of Example 6, and optionally, wherein the NNPID-based power controller is configured to set a first smoothing factor of the NNPID controller based on a first temperature tolerance, and to set a second smoothing factor of the NNPID controller based on a second temperature tolerance, wherein the first temperature tolerance is higher than the second temperature tolerance, wherein the first smoothing factor is higher than the second smoothing factor.

Example 8 includes the subject matter of any one of Examples 2-7, and optionally, wherein the one or more NN settings of the NNPID controller comprises a temperature offset of the NNPID controller, the temperature offset comprising an offset from the target temperature at which the NNPID controller is to be activated.

Example 9 includes the subject matter of Example 8, and optionally, wherein the NNPID-based power controller is configured to set a first temperature offset of the NNPID controller based on a first temperature tolerance, and to set a second temperature offset of the NNPID controller based on a second temperature tolerance, wherein the first temperature tolerance is higher than the second temperature tolerance, wherein the second temperature offset is higher than the first temperature offset.

Example 10 includes the subject matter of any one of Examples 2-9, and optionally, wherein the temperature tolerance corresponding to the temperature sensor comprises a predefined temperature tolerance setting from a plurality of predefined temperature tolerance settings, wherein the NNPID-based power controller is configured to determine one or more NN settings of the NNPID controller according to a predefined NN setting corresponding to the predefined temperature tolerance setting.

Example 11 includes the subject matter of Example 10, and optionally, wherein the plurality of predefined temperature tolerance settings comprises at least one of a high tolerance setting, a medium tolerance setting, or a low tolerance setting.

Example 12 includes the subject matter of any one of Examples 2-11, and optionally, wherein the one or more sensor-based inputs comprises a first sensor-based input comprising a first temperature tolerance corresponding to a first temperature sensor, and a second sensor-based input comprising a second temperature tolerance corresponding to a second temperature sensor, wherein the second temperature tolerance is different from the first temperature tolerance.

Example 13 includes the subject matter of any one of Examples 1-12, and optionally, wherein the sensor-based input corresponding to the temperature sensor comprises a setting of at least one power threshold corresponding to the target temperature, wherein the power-setting controller is configured to determine the sensor-based power setting based on the at least one power threshold.

Example 14 includes the subject matter of Example 13, and optionally, wherein the at least one power threshold comprises at least one of a minimal power threshold or a maximal power threshold.

Example 15 includes the subject matter of any one of Examples 1-14, and optionally, wherein the sensor-based input corresponding to the temperature sensor comprises a plurality of settings of at least one power threshold corresponding to a plurality of target temperatures corresponding to the temperature sensor, wherein the power-setting controller is configured to determine the power setting for the processor based on one or more additional settings of the at least one power threshold corresponding to one or more additional target temperatures, which are between two consecutive target temperatures in the first plurality of target temperatures, wherein the power-setting controller is configured to determine the one or more additional settings of the at least one power threshold based on two settings of the at least one power threshold corresponding to the two consecutive target temperatures.

Example 16 includes the subject matter of Example 15, and optionally, wherein the power-setting controller is configured to determine the one or more additional settings of the at least one power threshold based on an interpolation of the two settings of the at least one power threshold corresponding to the two consecutive target temperatures.

Example 17 includes the subject matter of Example 15 or 16, and optionally, wherein the at least one power threshold comprises at least one of a minimal power threshold or a maximal power threshold.

Example 18 includes the subject matter of any one of Examples 1-17, and optionally, wherein the one or more sensor-based inputs comprises a plurality of sensor-based inputs corresponding to a plurality of temperature sensors, wherein the one or more NNPID-based power controllers comprises a plurality of NNPID-based power controllers configured to provide a plurality of sensor-based power settings based on the plurality of sensor-based inputs, wherein the power setting is based on one or more of the plurality of sensor-based power settings.

Example 19 includes the subject matter of Example 18, and optionally, wherein the power setting is based on a minimal power setting of the plurality of sensor-based power settings.

Example 20 includes the subject matter of any one of Examples 1-19, and optionally, wherein the NNPID controller comprises a first NN input node to input the target temperature corresponding to the temperature sensor; a second NN input node to input the temperature input corresponding to the temperature sensor; a NN Proportional (P) node configured to provide a P-node output based on a first weighted combination of outputs of the first and second NN input nodes; an NN Integral (I) node configured to provide an I-node output based on an integral over time of a second weighted combination of outputs of the first and second NN input nodes; a NN Derivative (D) node configured to provide a D-node output based on a derivative over time of a third weighted combination of outputs of the first and second NN input nodes; and a combiner to provide the temperature setting at an NN output node based on a combination of the P-node output, the I-node output, and the D-node output.

Example 21 includes the subject matter of any one of Examples 1-20, and optionally, wherein the power-setting controller is configured to store the power setting in a register of a power management controller of the processor.

Example 22 includes the subject matter of any one of Examples 1-21, and optionally, comprising the processor and the one or more sensors.

Example 23 comprises a computing device comprising the apparatus of any one of Examples 1-22.

Example 24 comprises a mobile device comprising the apparatus of any one of Examples 1-22.

Example 25 comprises an apparatus comprising means for executing any of the described operations of Examples 1-22.

Example 26 comprises a product comprising one or more tangible computer-readable non-transitory storage media comprising instructions operable to, when executed by at least one processor, enable the at least one processor to cause a device to perform any of the described operations of Examples 1-22.

Example 27 comprises an apparatus comprising: a memory interface; and processing circuitry configured to: perform any of the described operations of Examples 1-22.

Example 28 comprises a method comprising any of the described operations of Examples 1-22.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a power-setting controller configured to provide a power setting for a processor based on one or more sensor-based inputs corresponding to one or more temperature sensors, wherein a sensor-based input corresponding to a temperature sensor comprises a temperature input and a target temperature, the power-setting controller comprising:
one or more Neural-Network (NN) Proportional Integral Derivative (PID) based (NNPID-based) power controllers configured to provide one or more sensor-based power settings corresponding to the one or more temperature sensors, wherein an NNPID-based power controller of the NNPID-based power controllers is configured to provide a sensor-based power setting corresponding to the temperature sensor based on the sensor-based input corresponding to the temperature sensor, the NNPID-based power controller comprising:
an NNPID controller configured to determine a temperature setting based on the temperature input and the target temperature corresponding to the temperature sensor; and
a converter configured to convert the temperature setting into the sensor-based power setting; and
an output to provide the power setting based on the one or more sensor-based power settings.

2. The apparatus of claim 1, wherein the sensor-based input corresponding to the temperature sensor comprises a temperature tolerance corresponding to the temperature sensor, wherein the NNPID-based power controller is configured to provide the sensor-based power setting based on the temperature tolerance corresponding to the temperature sensor.

3. The apparatus of claim 2, wherein the NNPID-based power controller is configured to determine one or more NN settings of the NNPID controller based on the temperature tolerance corresponding to the temperature sensor.

4. The apparatus of claim 2, wherein the one or more NN settings of the NNPID controller comprises a learning rate of the NNPID controller.

5. The apparatus of claim 4, wherein the NNPID-based power controller is configured to set a first learning rate of the NNPID controller based on a first temperature tolerance, and to set a second learning rate of the NNPID controller based on a second temperature tolerance, wherein the first temperature tolerance is higher than the second temperature tolerance, wherein the first learning rate is higher than the second learning rate.

6. The apparatus of claim 2, wherein the one or more NN settings of the NNPID controller comprises a smoothing factor of the NNPID controller.

7. The apparatus of claim 6, wherein the NNPID-based power controller is configured to set a first smoothing factor of the NNPID controller based on a first temperature tolerance, and to set a second smoothing factor of the NNPID controller based on a second temperature tolerance, wherein the first temperature tolerance is higher than the second temperature tolerance, wherein the first smoothing factor is higher than the second smoothing factor.

8. The apparatus of claim 2, wherein the one or more NN settings of the NNPID controller comprises a temperature offset of the NNPID controller, the temperature offset comprising an offset from the target temperature at which the NNPID controller is to be activated.

9. The apparatus of claim 8, wherein the NNPID-based power controller is configured to set a first temperature offset of the NNPID controller based on a first temperature tolerance, and to set a second temperature offset of the NNPID controller based on a second temperature tolerance, wherein the first temperature tolerance is higher than the second temperature tolerance, wherein the second temperature offset is higher than the first temperature offset.

10. The apparatus of claim 2, wherein the temperature tolerance corresponding to the temperature sensor comprises a predefined temperature tolerance setting from a plurality of predefined temperature tolerance settings, wherein the NNPID-based power controller is configured to determine one or more NN settings of the NNPID controller according to a predefined NN setting corresponding to the predefined temperature tolerance setting.

11. The apparatus of claim 10, wherein the plurality of predefined temperature tolerance settings comprises at least one of a high tolerance setting, a medium tolerance setting, or a low tolerance setting.

12. The apparatus of claim 2, wherein the one or more sensor-based inputs comprises a first sensor-based input comprising a first temperature tolerance corresponding to a first temperature sensor, and a second sensor-based input comprising a second temperature tolerance corresponding to a second temperature sensor, wherein the second temperature tolerance is different from the first temperature tolerance.

13. The apparatus of claim 1, wherein the sensor-based input corresponding to the temperature sensor comprises a setting of at least one power threshold corresponding to the target temperature, wherein the power-setting controller is configured to determine the sensor-based power setting based on the at least one power threshold.

14. The apparatus of claim 1, wherein the sensor-based input corresponding to the temperature sensor comprises a plurality of settings of at least one power threshold corresponding to a plurality of target temperatures corresponding to the temperature sensor, wherein the power-setting controller is configured to determine the power setting for the processor based on one or more additional settings of the at least one power threshold corresponding to one or more additional target temperatures, which are between two consecutive target temperatures in the plurality of target temperatures, wherein the power-setting controller is configured to determine the one or more additional settings of the at least one power threshold based on two settings of the at least one power threshold corresponding to the two consecutive target temperatures.

15. The apparatus of claim 1, wherein the one or more sensor-based inputs comprises a plurality of sensor-based inputs corresponding to a plurality of temperature sensors, wherein the one or more NNPID-based power controllers comprises a plurality of NNPID-based power controllers configured to provide a plurality of sensor-based power settings based on the plurality of sensor-based inputs, wherein the power setting is based on one or more of the plurality of sensor-based power settings.

16. The apparatus of claim 1, wherein the NNPID controller comprises:
    a first NN input node to input the target temperature corresponding to the temperature sensor;
    a second NN input node to input the temperature input corresponding to the temperature sensor;
    a NN Proportional (P) node configured to provide a P-node output based on a first weighted combination of outputs of the first and second NN input nodes;
    an NN Integral (I) node configured to provide an I-node output based on an integral over time of a second weighted combination of outputs of the first and second NN input nodes;
    a NN Derivative (D) node configured to provide a D-node output based on a derivative over time of a third weighted combination of outputs of the first and second NN input nodes; and
    a combiner to provide the temperature setting at an NN output node based on a combination of the P-node output, the I-node output, and the D-node output.

17. The apparatus of claim 1, wherein the power-setting controller is configured to store the power setting in a register of a power management controller of the processor.

18. The apparatus of claim 1 comprising a computing device, the computing device comprising the processor, the one or more sensors, and a memory to store information processed by the processor.

19. A product comprising one or more tangible computer-readable non-transitory storage media comprising instructions operable to, when executed by at least one processor, enable the at least one processor to cause a power-setting controller to:
    provide a power setting for a target processor based on one or more sensor-based inputs corresponding to one or more temperature sensors, wherein a sensor-based input corresponding to a temperature sensor comprises a temperature input and a target temperature, wherein the instructions, when executed cause the power-setting controller to:
        provide by one or more Neural-Network (NN) Proportional Integral Derivative (PID) based (NNPID-based) power controllers one or more sensor-based power settings corresponding to the one or more temperature sensors, wherein providing the one or more sensor-based power settings comprises providing by an NNPID-based power controller of the NNPID-based power controllers a sensor-based power setting corresponding to the temperature sensor based on the sensor-based input corresponding to the temperature sensor by:
            determining at an NNPID controller a temperature setting based on the temperature input and the target temperature corresponding to the temperature sensor; and
            converting the temperature setting into the sensor-based power setting; and
        provide the power setting based on the one or more sensor-based power settings.

20. The product of claim 19, wherein the sensor-based input corresponding to the temperature sensor comprises a temperature tolerance corresponding to the temperature sensor, wherein the instructions, when executed, cause the power-setting controller to provide the sensor-based power setting based on the temperature tolerance corresponding to the temperature sensor.

\* \* \* \* \*